United States Patent

Nakamura et al.

[11] Patent Number: 6,153,715
[45] Date of Patent: Nov. 28, 2000

[54] PROPYLENIC RESIN AND BLOW MOLDED ARTICLE MADE THEREFROM

[75] Inventors: Tetsuya Nakamura; Masaya Tsubokawa, both of Ichihara, Japan

[73] Assignee: Idemitsu Petrochemical Co., Ltd., Tokyo, Japan

[21] Appl. No.: 09/154,732

[22] Filed: Sep. 17, 1998

[51] Int. Cl.$^7$ .................... C08F 110/06; C08L 23/12
[52] U.S. Cl. .................. 526/351; 526/348; 525/240; 293/132; 293/136; 524/115; 524/127; 524/451; 524/425; 524/500; 524/511; 524/515; 524/529; 524/534; 524/583; 524/584
[58] Field of Search ..................... 526/159, 348, 526/351; 524/115, 127, 451, 452, 500, 511, 515, 529, 534, 583, 584; 525/240; 293/132, 136

[56] References Cited

U.S. PATENT DOCUMENTS

| | | | |
|---|---|---|---|
| 5,331,054 | 7/1994 | Fujita et al. | 525/240 |
| 5,736,613 | 4/1998 | Kijima et al. | 525/322 |

*Primary Examiner*—David Wu
*Assistant Examiner*—R. Harlan
*Attorney, Agent, or Firm*—Oblon, Spivak, McClelland, Maier & Neustadt, P.C.

[57] ABSTRACT

A propylene resin composition composed of a nucleating agent and a propylene resin having a melt index (MI) of not greater than 1.2 g/10 min and satisfying a relationship between elongational viscosity ($\eta_E$) and melt index (MI) represented by $$2.0 \times 10^5 \times MI^{-0.68} \geq \eta_E \geq 1.5 \times 10^5 MI \times MI^{-0.68}.$$

The composition is endowed with high-rigidity, has excellent drawdown resistance, ensures practical discharge rate during blow-molding at low resin temperature of 220° C. or less, and enables high-productivity production of large-sized blow-molded parts featuring light weight, excellent rigidity, dimensional stability, and heat resistance. Blow-molding of the propylene resin composition provides a blow-molded article which is advantageously used as, particularly, a large-sized automobile part, such as a bumper, a bumper beam, a seat back, an instrument panel, or a like part.

10 Claims, No Drawings

PROPYLENIC RESIN AND BLOW MOLDED ARTICLE MADE THEREFROM

BACKGROUND OF THE INVENTION

1. Field of the Invention

The present invention relates to a highly rigid propylene resin and to a blow-molded article made from the resin. More particularly, the invention relates to a highly rigid propylene resin which enables manufacture of large-sized blow-molded articles featuring light weight and excellent rigidity, dimensional stability, and heat resistance and which shows good drawdown resistance, as well as to a blow-molded article which is made from the resin and is advantageously used as, particularly, an automotive bumper, bumper beam, or a like part.

2. Description of the Related Art

Conventionally, propylene resins are used as general-purpose resins for manufacturing products of various shapes by various molding methods, including extrusion molding, injection molding, and blow molding. Because blow molding makes use of inexpensive molds and is a simple molding process attained through employment of integral molding, it has been intensively used for molding large-sized structural elements, mainly automobile parts. In view of specific gravity, rigidity, dimensional stability, and heat resistance, in many cases propylene resins are used as materials for such blow molding.

However, such conventionally used propylene resins are not necessarily satisfactory in terms of drawdown resistance or rigidity required for blow molding. Thus, various improvements on propylene resins have been developed. For example, there are disclosed a technique for improving drawdown resistance by manufacture of propylene resin through multi-step polymerization (Japanese Patent Publication (kokoku) No. 63-36609), a technique for improving rigidity by addition of a nucleating agent to propylene resin manufactured through multi-step polymerization (Japanese Patent Publication (kokoku) No. 3-74264), and a technique for improving drawdown resistance and resistance by addition of a nucleating agent to propylene resin manufactured through multi-step polymerization (Japanese Patent Application Laid-Open (kokai) 63-213547).

Although these techniques improve rigidity and drawdown resistance to a certain extent, in cases where large-sized blow-molded parts having a parison weight of not less than approximately 5 kg are molded, drawdown resistance attained by these techniques is insufficient, resulting in disabled molding or nonuniform thickness distribution in a blow-molded product. Therefore, the thus-obtained products tend to be unsatisfactory.

To solve the above problems, there has been developed, for example, a highly rigid propylene resin which is manufactured through multi-step polymerization, including polymerization of propylene and copolymerization of propylene and ethylene, and which allows manufacture of a large-sized blow-molded article featuring light weight and excellent rigidity, dimensional stability, and heat resistance, through adjustment of its melt index and the relation between its elongational viscosity and its melt index (USP5736613).

Although these techniques improve rigidity and drawdown resistance, in cases where blow molding is performed at a resin temperature of not higher than 230° C., particularly not higher than 220° C., blow molding may suffer an insufficient discharge rate, resulting in a reduction in productivity.

Accordingly, an object of the present invention is to develop a propylene resin having excellent rigidity and therefore showing good drawdown resistance, which enables manufacture of large-sized blow-molded articles featuring light weight and excellent rigidity, dimensional stability, and heat resistance, and being discharged by a sufficient amount in practice even during blow molding performed at a resin temperature of not higher than 220° C., which enables excellent productivity.

Another object of the present invention is to provide a blow-molded article which is made from the propylene resin and is favorably used as, particularly, a large-sized automobile part, such as a bumper, a bumper beam, a seat back, an instrument panel, or a like part.

SUMMARY OF THE INVENTION

In view of the foregoing, the inventors of the present invention conducted extensive studies in an attempt to develop a highly rigid propylene resin having the above favorable properties, as well as a blow-molded article made therefrom. Specifically, the inventors obtained a propylene resin which shows a melt index falling within a certain range and a specific relationship between elongational viscosity and melt index, particularly a propylene resin produced through multi-step polymerization involving polymerization of propylene and copolymerization of propylene and ethylene. A nucleating agent was added to the thus-obtained propylene resin, yielding a propylene resin composition which was found to achieve the above objects. Based on the findings, the present invention was completed.

Accordingly, in one aspect of the present invention, there is provided a propylene resin composition composed of a nucleating agent and a propylene resin having a melt index (MI) of not greater than 1.2 g/10 min as measured at a temperature of 230° C. and under a load of 2,160 g and satisfying a relationship between elongational viscosity ($\eta_{69}$) and melt index (MI) represented by $$2.0 \times 10^5 \times MI^{-0.68} \geq \eta_E \geq 1.5 \times 10^5 \times MI^{-0.68}.$$

The present invention also provides a propylene resin composition composed of a nucleating agent and a propylene resin composition comprising the above-described propylene resin and a polyolefin resin and/or an inorganic particulate filler. The propylene resin is preferably obtained through multi-step polymerization, including polymerization of propylene and copolymerization of propylene and ethylene.

The present invention also provides a blow-molded article which is made from the propylene resin and is used as, particularly, a large-sized automobile part, such as a bumper, a bumper beam, a seat back, an instrument panel, or a like part which is obtained by blow molding at a resin temperature not higher than 220° C.

The present invention further provides a method for manufacturing a blow-molded article such as a large-sized automobile part including a bumper, a bumper beam, a seat back, an instrument panel, or a like part through blow molding the propylene resin composition at a resin temperature of not higher than 220° C.

DESCRIPTION OF THE PREFERRED EMBODIMENTS

First, a propylene resin composition of the present invention will be described in detail.

The propylene resin composition of the present invention is composed of a certain propylene resin and a nucleating agent.

The propylene resin composition of the present invention has a melt index (MI) of not greater than 1.2 g/10 min as measured in accordance with JIS K-7210 and at a temperature of 230° C. and under a load of 2,160 g. If MI is in excess of 1.2 g/10 min, ordinary blow molding becomes difficult. Also, in view of discharge rate during blow molding, productivity, and moldability, the MI is preferably 0.2 to 1.0 g/10 min, more preferably 0.3 to 0.8 g/10 min.

The propylene resin of the present invention satisfies the relationship between elongational viscosity ($\eta_E$) and the above-mentioned MI as represented by the expression $$2.0 \times 10^5 \times MI^{-0.68} \geq \eta_E \geq 1.5 \times 10^5 \times MI^{-0.68}.$$

If $\eta_{69}$ is lower than $1.5 \times 10^5 \times MI^{-0.68}$, a parison will show significant drawdown during blow molding; consequently, blow molding of a large-sized article corresponding to a parison of not less than 3 kg, particularly not less than 5 kg, becomes difficult. By contrast, if the $\eta_E$ is greater than $2.0 \times 10^5 \times MI^{-0.68}$ blow molding may suffer an insufficient discharge rate, resulting in a reduction in productivity.

As used herein, the elongational viscosity $\eta_E$ is measured through use of a drawing rheometer manufactured by Iwamoto Seisakusho Co., Ltd. in the following manner. A sample bar having a diameter of 3 mm and a length of 20 cm is placed stationary in silicone oil for 15 minutes and is then measured for elongational viscosity $\eta_E$ at a temperature of 175° C., a strain rate of 0.05 sec$^{-1}$, and a strain of 2.0.

Within the scope of the present invention, an additional thermoplastic resin may be added to the propylene resin of the present invention. Examples of the additional thermoplastic resin include polyolefin resins such as linear high-density polyethylene, linear low-density polyethylene, high-pressure low-density polyethylene, isotactic polypropylene, syndiotactic polypropylene, block polypropylene, random polypropylene, polybutene, 1,2-polybutadiene, 4-methylpentene, cyclized polyolefin, or copolymers thereof; polystyrene resins such as atactic polystyrene, isotactic polystyrene, HIPS, ABS, AS, styrene-methacrylic acid copolymers, styrene-alkyl methacrylate ester copolymers, styrene-diglycidyl methacrylate ester copolymers, styrene-acrylic acid copolymers, styrene-alkyl acrylate ester copolymers, styrene-maleic acid copolymers, or styrene-fumaric acid copolymers; polyester resins such as polycarbonate, polyethylene terephthalate, or polybutylene terephthalate; polyamides such as polyamide 6 or polyamide 6,6; polyphenylene ethers; polyarylene sulfides; and fluorinated polyethylene resins such as poly(tetrafluoroethylene) (PTFE). Of these, polyolefins such as polyethylene or polypropylene are preferred. These thermoplastic resins may be used singly or in combination of two or more species.

No particular limitation is imposed on the method for producing the propylene resin of the present invention, and any of a variety of methods may be employed so long as the method produces a propylene resin which satisfies the above-described conditions. In particular, there may be suitably employed a method in which propylene polymers and a propylene-ethylene copolymer are subjected to multi-step polymerization.

Preferably, in the first and second steps of the multi-step polymerization, propylene polymers are formed by use of a stereospecific catalyst such that each propylene polymer possesses a intrinsic viscosity [$\eta$] that differs from that of the other propylene polymer, and in the third step a propylene-ethylene copolymer is formed.

Examples of the stereospecific catalyst which is used in the above multi-step polymerization include a catalyst comprising a transition metal halide and an organo-aluminum compound.

Examples of the transition metal halide include titanium halides, and titanium trichloride is particularly preferred. Examples of the variation of titanium trichloride include reductants of titanium tetrachloride obtained through any of a variety of methods; activated species of the reductants obtained through further ball-mill treatment and/or washing with a solvent such as an inert solvent or an inert solvent containing a polar compound; amine-, ether-, ester-, sulfur- or halogen-derivatives of titanium trichloride or eutectic crystals of titanium trichloride such as TiCl$_3$·1/3AlCl$_3$; and titanium trichloride which is co-crushed with an organic or inorganic nitrogen or phosphorus compound. A titanium halide-on-magnesium carrier may also be used.

Examples of the organo-aluminum compound include compounds represented by formula (I):

$$AlR_nX_{3-n} \tag{I}$$

wherein R represents a C1–C10 alkyl group; X represents a halogen atom; and n represents a number of $0 < n \leq 3$.

Examples of the organo-aluminum compounds include dimethylaluminum chloride, diethylaluminum chloride, ethylaluminum sesquichloride, ethylaluminum dichloride, and triethylaluminum. These aluminum compounds may be used singly or in combination of two or more species, and are typically used in an amount of 1–100 mol based on one mol of the above-described transition metal halides.

During the above-described multi-step polymerization, in the first step, polymerization of propylene is preferably performed at 50–70° C. so as to form a propylene polymer having a intrinsic viscosity (135° C., in decalin) [$\eta$] of 0.5–3.0 dl/g, in an amount corresponding to the polymerization ratio of 60–80 wt. % based on the total polymerization amount. When the intrinsic viscosity [$\eta$] is less than 0.5 dl/g, the obtained propylene resin has poor impact strength, whereas when it is in excess of 3.5 dl/g, the discharge rate during blow molding decreases. When the polymerization ratio is less than 60 wt. %, the obtained propylene has poor rigidity, whereas when it is in excess of 80 wt. %, the impact strength thereof decreases.

Subsequently, in the second step, polymerization of propylene is preferably performed at 50–70° C. so as to form a propylene polymer having a intrinsic viscosity (135° C., in decalin) [$\eta$] of 3.5–5.5 dl/g, in an amount corresponding to the polymerization ratio of 10–20 wt. % based on the total polymerization amount. When the intrinsic viscosity [$\eta$] is less than 3.5 dl/g, the obtained propylene resin has poor impact strength, whereas when it is in excess of 5.5 dl/g, the discharge rate during blow molding decreases. When the polymerization ratio is less than 10 wt. %, the obtained propylene has poor rigidity, whereas when it is in excess of 20 wt. %, the impact strength thereof decreases.

Finally, in the third step, copolymerization of propylene and ethylene is preferably performed at 45–65° C. so as to form a propylene-ethylene copolymer having a intrinsic viscosity (135° C., in decalin) [$\eta$] of 3.5–5.5 dl/g and having an ethylene unit content of 40–75 wt. %, in an amount corresponding to the polymerization ratio of 8–15 wt. % based on the total polymerization amount. Upon completion of the steps, the propylene resin of the present invention contains ethylene in an amount of about 3 to about 12 wt. %. When the intrinsic viscosity [$\eta$] is less than 3.5 dl/g, the obtained propylene resin has poor impact strength, whereas when it is in excess of 5.5 dl/g, the discharge rate during blow molding decreases. When the polymerization ratio of the propylene-ethylene copolymer is less than 8 wt. %, the obtained propylene has low impact strength, whereas when it is in excess of 15 wt. %, the rigidity thereof decreases.

Furthermore, when the propylene-ethylene copolymer contains ethylene units in an amount of less than 40 wt. %, the obtained propylene resin has low impact strength, whereas when it is in excess of 60 wt. %, the rigidity thereof decreases. The ethylene unit content is obtained by measuring the infrared absorption spectrum thereof.

For each reaction step the intrinsic viscosity [η] of the polymers may be regulated by appropriately varying the concentration of a molecular weight-regulating agent such as hydrogen, and the pressure of the polymerization reactions is typically selected within a range from normal pressure to 30 kg/cm²G, preferably 1–15 kg/cm²G.

Examples of the method of polymerization include a continuous method making use of three or more polymerization tanks; a batch method making use of one or more polymerization tanks; and a combination thereof. No particular limitation is imposed on the polymerization method, and there may be employed any method, such as suspension polymerization, liquid polymerization, or gas-phase polymerization.

When a solvent is used, examples of the solvent include aliphatic hydrocarbons such as heptane or hexane; alicyclic hydrocarbons such as cyclohexane; and aromatic hydrocarbons such as benzene or toluene. These solvents may be used singly or in combination of two or more species.

Next will be described a nucleating agent added to the above-described propylene resin.

In the present invention, a nucleating agent is a substance having a nucleating effect. Any conventionally known nucleating agent is acceptable so long as it promptly induces a crystalline nucleus without impairing physical properties of the propylene resin and decreases a degree of supercooling required for initiation of crystallization. Examples of such a nucleating agent include high-melting-point polymers; organic carboxylic acid or its metal salts; aromatic sulfonate or its metal salts; organic phosphate compounds or their metal salts; dibenzylidenesorbitol or its derivatives; partial metal salts of rhodinic acid; inorganic particles; imides; amides; quinacridones; quinones; and mixtures thereof. Of these, the following nucleating agents are particularly preferred.

Examples of high-melting-point polymers serving as the nucleating agents include polyolefins such as polyethylene or polypropylene; polyvinylcycloalkanes such as polyvinylcyclohexane or polyvinylcyclopentane; poly(3-methylpentene-1); poly(3-methylbutene-1); and polyalkenylsilanes. Examples of metal salts serving as the nucleators include aluminum benzoate, aluminum p-t-butylbenzoate, sodium adipate, sodium thiophenecarboxylate, and sodium pyrrolecarboxylate.

Examples of inorganic microparticles serving as the nucleators include talc, clay, mica, asbestos, glass flake, glass beads, calcium silicate, montmorillonite, bentonite, graphite, aluminum powder, alumina, silica, kieselguhr, titanium oxide, magnesium oxide, pumice powder, pumice balloon, aluminum hydroxide, magnesium hydroxide, basic magnesium carbonate, dolomite, calcium sulfate, potassium titanate, barium sulfate, calcium sulfite, and molybdenum sulfide. These inorganic particles may be used singly or in combination of two or more species.

Metal salts of an organic phosphoric acid are also preferred as the nucleating agents, which salts are represented by the formula (2), or (3) described below.

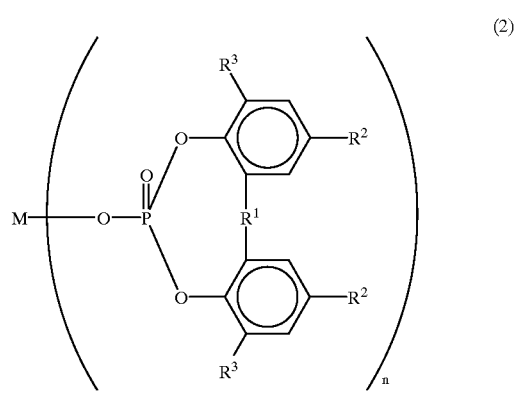

wherein $R^1$ represents oxygen, sulfur, a C1–C10 hydrocarbon group; each of $R^2$ and $R^3$, which may be identical to or different from each other, represents hydrogen or a C1–C10 hydrocarbon group; any two groups of $R^2$ and $R^3$ may link to form a cyclic structure; M represents a 1–3 valent metal atom; and n represents an integer between 1 and 3 inclusive. Specific examples thereof include sodium 2,2'-methylenebis (4,6-di-t-butylphenyl)phosphate, sodium 2,2'-ethylidenebis (4,6-di-t-butylphenyl)phosphate, lithium 2,2'-methylenebis (4,6-di-t-butylphenyl)phosphate, lithium 2,2'-ethylidenebis (4,6-di-t-butylphenyl)phosphate, sodium 2,2'-ethylidenebis (4-i-propyl-6-t-butylphenyl)phosphate, lithium 2,2'-methylenebis(4-methyl-6-t-butylphenyl)phosphate, lithium 2,2'-methylenebis(4-ethyl-6-t-butylphenyl)phosphate, calcium bis[2,2'-thiobis(4-methyl-6-t-butylphenyl)phosphate], calcium bis[2,2'-thiobis(4-ethyl-6-t-butylphenyl) phosphate], calcium bis[2,2'-thiobis(4,6-di-t-butylphenyl) phosphate], magnesium bis[2,2'-thiobis(4,6-di-t-butylphenyl)phosphate], magnesium bis[2,2'-thiobis(4-t-octylphenyl)phosphate], sodium 2,2'-butylidenebis(4,6-dimethylphenyl)phosphate, sodium 2,2'-butylidenebis(4,6-di-t-butylphenyl)phosphate, sodium 2,2'-t-octylmethylenebis(4,6-dimethylphenyl)phosphate, sodium 2,2'-t-octylmethylenebis(4,6-di-t-butylphenyl)phosphate, calcium bis[2,2'-methylenebis(4,6-di-t-butylphenyl) phosphate], magnesium bis[2,2'-methylenebis(4,6-di-t-butylphenyl)phosphate], barium bis[2,2'-methylenebis(4,6-di-t-butylphenyl)phosphate], sodium 2,2'-methylenebis(4-methyl-6-t-butylphenyl)phosphate, sodium 2,2'-methylenebis(4-ethyl-6-t-butylphenyl)phosphate, sodium (4,4'-dimethyl-5,6'-di-t-butyl-2,2'-biphenyl)phosphate, calcium bis[(4,4'-dimethyl-6,6-di-t-butyl-2,2'-biphenyl) phosphate], sodium 2,2'-ethylidenebis(4-N-butyl-6-t-butylphenyl)phosphate, sodium 2,2'-methylenebis(4,6-dimethylphenyl)phosphate, sodium 2,2'-methylenebis(4,6-diethylphenyl)phosphate, potassium 2,2'-ethylidenebis(4,6-di-t-butylphenyl)phosphate, calcium bis[2,2'-ethylidenebis (4,6-di-t-butylphenyl)phosphate], magnesium bis[2,2'-ethylidenebis(4,6-di-t-butylphenyl)phosphate], barium bis [2,2'-ethylidenebis(4,6-di-t-butylphenyl)phosphate], aluminum tris[2,2'-methylenebis(4,6-di-t-butylphenyl) phosphate], aluminum tris[2,2'-ethylidenebis(4,6-di-t-butylphenyl)phosphate], and a mixture containing 2 or more of the above compounds. Of these, sodium 2,2'-methylenebis(4,6-di-t-butylphenyl)phosphate is particularly preferred.

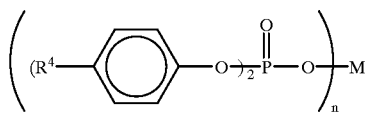

(3)

wherein $R^4$ represents hydrogen or a C1–C10 hydrocarbon group; M represents a 1–3 valent metal atom; and n represents an integer between 1 and 3 inclusive. Specific examples thereof include sodium bis(4-t-butylphenyl)phosphate, sodium bis(4-methylphenyl)phosphate, sodium bis(4-ethylphenyl)phosphate, sodium bis(4-i-propylphenyl)phosphate, sodium bis(4-t-octylphenyl)phosphate, potassium bis(4-t-butylphenyl)phosphate, calcium bis(4-t-butylphenyl)phosphate, magnesium bis(4-t-butylphenyl)phosphate, lithium bis(4-t-butylphenyl)phosphate, aluminum bis(4-t-butylphenyl)phosphate, and a mixture containing 2 or more of the above compounds. Of these, sodium bis(4-t-butylphenyl)phosphate is particularly preferred.

Organic compounds which are also preferred as the nucleating agents are represented by the formula (4) described below:

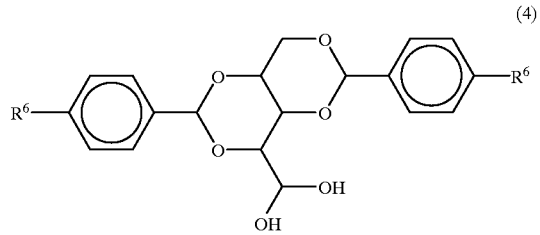

(4)

wherein $R^5$ represents hydrogen or a C1–C10 hydrocarbon group. Specific examples thereof include 1,3,2,4-dibenzylidenesorbitol, 1,3-benzylidene-2,4-p-methylbenzylidenesorbitol, 1,3-benzylidene-2,4-p-ethylbenzylidenesorbitol, 1,3-p-methylbenzylidene-2,4-benzylidenesorbitol, 1,3-p-ethylbenzylidene-2,4-benzylidenesorbitol, 1,3-p-methylbenzylidene-2,4-p-ethylbenzylidenesorbitol, 1,3-p-ethylbenzylidene-2,4-p-methylbenzylidenesorbitol, 1,3,2,4-di(p-methylbenzylidene)sorbitol, 1,3,2,4-di(p-ethylbenzylidene)sorbitol, 1,3,2,4-di(p-n-propylbenzylidene)sorbitol, 1,3,2,4-di(p-i-propylbenzylidene)sorbitol, 1,3,2,4-di(p-n-butylbenzylidene)sorbitol, 1,3,2,4-di(p-s-butylbenzylidene)sorbitol, 1,3,2,4-di(p-t-butylbenzylidene)sorbitol, 1,3,2,4-di(2',4'-dimethylbenzylidene)sorbitol, 1,3,2,4-di(p-methoxybenzylidene)sorbitol, 1,3,2,4-di(p-ethoxybenzylidene)sorbitol, 1,3-benzylidene-2,4-p-chlorobenzylidenesorbitol, 1,3-p-chlorobenzylidene-2,4-benzylidenesorbitol, 1,3-p-chlorobenzylidene-2,4-p-methylbenzylidenesorbitol, 1,3-p-chlorobenzylidene-2,4-p-ethylbenzylidenesorbitol, 1,3-p-methylbenzylidene-2,4-p-chlorobenzylidenesorbitol, 1,3-p-ethylbenzylidene-2,4-p-chlorobenzylidenesorbitol, 1,3,2,4-di(p-chlorobenzylidene)sorbitol, and a mixture containing 2 or more of the above compounds. Of these, 1,3,2,4-dibenzylidenesorbitol, 1,3,2,4-di(p-methylbenzylidene)sorbitol, 1,3,2,4-di(p-ethylbenzylidene) sorbitol, 1,3-p-chlorobenzylidene-2,4-p-methylbenzylidenesorbitol, 1,3,2,4-di(p-chlorobenzylidene)sorbitol, and a mixture containing 2 or more of the above compounds are particularly preferred.

Examples of other nucleating agents include metal salts of an aromatic or aliphatic carboxylic acid. Specifically, mention may be given of aluminum benzoate, aluminum p-t-butylbenzoate, sodium adipate, sodium thiophenecarboxylate, and sodium pyrrolecarboxylate.

The above-described nucleating agents are preferably incorporated into the propylene resin in an amount of 0.001–10 parts by weight, particularly preferably 0.1–3 parts by weight, based on 100 parts by weight of the propylene resin.

In addition to the nucleating agents, an inorganic filler may be incorporated into the propylene resin composition of the present invention, according to needs.

No particular limitation is imposed on the types of the inorganic fillers, and fibrous, granular, and powder fillers may be used. Examples of the fibrous fillers include carbon fiber and whiskers, which fillers may have a form of cloth, mat, cut bundles, chopped fiber, filament, or whisker.

Examples of the granular or powder fillers include talc, clay, mica, asbestos, graphite, carbon black, glass flake, glass beads, glass powder, montmorillonite, bentonite, kaolin, kieselguhr, dolomite, alumina, silica, titanium dioxide, magnesium oxide, tin oxide, aluminum hydroxide, magnesium hydroxide, basic magnesium carbonate, barium sulfate, calcium sulfite, magnesium carbonate, calcium carbonate, barium carbonate, calcium silicate, potassium titanate, magnesium sulfate, calcium sulfate, molybdenum sulfide, oxysulfate, silicon carbide, aluminum powder, metal powder, pumice powder, and pumice balloon. Of these, calcium carbonate, talc, silica, mica, and kaolin are preferred.

These fillers may be surface-treated. Any of conventionally known coupling agents such as silane coupling agents and titanium coupling agents may be used in surface treatment in order to enhance adhesion between the fillers and the resins. These inorganic fillers may be used singly or in combination of two or more species.

Various additives may be added to the above-mentioned propylene resin composition as needed. Examples of such additives include soft elastomer, modified polyolefin, antioxidants, heat resistance stabilizers, weatherproof stabilizers, inorganic or organic fillers, antistatic agents, chlorine-uptaking agents, slip agents, flame retardants, and coloring agents.

The thus-obtained propylene resin composition has excellent properties which are inherent to propylene resin, exhibits excellent drawdown resistance, and can be used for blow molding at a low temperature. Thus, there can be ensured a sufficient discharge rate during blow molding performed at a resin temperature of not higher than 230° C., or even at a resin temperature of not higher than 220° C., to thereby enable high-productivity manufacture of blow-molded articles featuring excellent rigidity, dimensional stability, and heat resistance, even in cases where large-sized blow-molded articles having a weight of not less than 5 kg are molded.

A blow-molded article of the present invention may be manufactured by blow molding the above-mentioned propylene resin composition through use of a conventional blow molding apparatus. Blow molding conditions may also be conventional ones. For example, in cases of extrusion blow molding, resin temperature is not higher than 230° C., preferably 180° C. to 230° C., more preferably 200° C. to 220° C. The above-mentioned propylenic polymer composition having a proper temperature is extruded in the form of a molten tube-shaped parison. Next, the parison is held within a shaping mold. Subsequently, air is blown into the mold so as to shape the parison according to a profile of the mold, yielding a hollow molded article. The draw ratio in a lateral direction is preferably 1.5 to 5.

If blow molding is performed at a resin temperature of higher than 230° C. significant drawdown may be generated, leading to molding failure. If blow molding is performed at a resin temperature of lower than 180° C. discharge rate may be insufficient, leading to decrease in productivity.

Compared with a blow-molded article obtained by blow molding conventional polypropylene into which a large amount of an inorganic filler such as talc is incorporated, a blow-molded article of the present invention features light weight and excellent rigidity, dimensional stability, and heat resistance, and is favorably usable as, particularly, an automobile part, such as a bumper, bumper beam, trunk board, seat back, instrument panel, or spoiler.

EXAMPLES

The present invention will next be described by way of example, which should not be construed as limiting the invention.

The melt index (MI) and the elongational viscosity ($\eta_E$) of a propylene resin obtained in the production examples below were obtained according to the methods described herein. The ethylene unit content was obtained through measurement of infrared absorption spectrum. The elastic modulus in tension was obtained according to JIS K7113. The Izod impact value (at −20° C.) was obtained according to JIS K7110. The intrinsic viscosity [$\eta$] of a polymer in each step was measured in decalin at 135° C.

Production Example 1

Dehydrated n-hexane (5 liters), diethylaluminum chloride (1.0 g), and titanium trichloride (0.3 g) were placed in an autoclave equipped with a stirrer and having a capacity of 10 liters.

Next, while the liquid phase temperature was maintained at 65° C., hydrogen was added into the autoclave in an amount such that the generating propylene polymer has a predetermined intrinsic viscosity, and propylene was continuously fed into the autoclave so as to establish a reaction pressure of 9 kg/cm$^2$G. The resultant mixture was stirred for 90 minutes to thereby perform first-step polymerization. Subsequently, unreacted propylene was removed, and the liquid phase temperature was lowered to 50° C.

Next, hydrogen was fed into the autoclave in a predetermined amount and at a temperature of 50° C., and propylene was continuously fed into the autoclave in such a manner as to establish a reaction pressure of 9 kg/cm$^2$G, thereby performing second-step polymerization for 40 minutes.

Subsequently, hydrogen was fed into the autoclave in a predetermined amount and at a temperature of 50° C., and a mixture of propylene and ethylene was continuously fed into the autoclave in such a manner as to establish a reaction pressure of 5 kg/cm$^2$G, thereby performing third-step polymerization for 30 minutes.

Next, unreacted gas was removed. To the resultant polymerized product was added n-butanol (50 ml). The resultant mixture was stirred for 1 hour at a temperature of 65° C. so as to decompose catalyst, followed by separation, washing, and drying, thereby yielding a propylene resin (resin A) in the form of white powder.

Table 1 shows the intrinsic viscosity [$\eta$] and amount of polymerization obtained in each step.

Production Example 2

Polymerization was performed in a manner similar to that of Production Example 1 except that an amount of hydrogen to be fed into the autoclave was regulated in such a manner as to make the intrinsic viscosity [$\eta$] and amount of polymerization obtained in each step of polymerization identical to those described in Table 1, thereby yielding a propylene resin (resin C) in the form of white powder. Table 1 shows the intrinsic viscosity [$\eta$] and amount of polymerization obtained in each step. Table 2 shows the physical properties of the obtained propylene resin.

Production Example 3

Polymerization was performed in a manner similar to that of Production Example 1 except that an amount of hydrogen to be fed into the autoclave was regulated in such a manner as to make the intrinsic viscosity [$\eta$] and amount of polymerization obtained in each step of polymerization identical to those described in Table 1, thereby yielding a propylene resin (resin B) in the form of white powder. Table 1 shows the intrinsic viscosity [$\eta$] and amount of polymerization obtained in each step. Table 2 shows the physical properties of the obtained propylene resin.

Production Example 4

Polymerization was performed in a manner similar to that of Production Example 1 except that second-step polymerization was not performed and an amount of hydrogen to be fed into the autoclave was regulated in such a manner as to make the intrinsic viscosity [$\eta$] and amount of polymerization obtained in first-step and third-step polymerization identical to those described in Table 1, thereby yielding a propylene resin (resin D) in the form of white powder. Table 1 shows the intrinsic viscosity [$\eta$] and amount of polymerization obtained in each step.

Production Example 5

70% by weight of polypropylene (ethylene content: 5% by weight; MI: 0.9 g/10 min), 20% by weight of high-density polyethylene (HLMI: 3.8 g/10 min), and 10% by weight of talc were mixed to prepare a propylene resin (resin E).

TABLE 1

|  | First Step | | Second Step | | Third Step | |
|---|---|---|---|---|---|---|
|  | [$\eta$] | Polymerization Ratio (wt %) | [$\eta$] | Polymerization Ratio (wt %) | [$\eta$] | Polymerization Ratio (wt %) |
| Production Example 1 | 2.9 | 76 | 5.9 | 10 | 4.6 | 14 |
| Production Example 2 | 2.4 | 78 | 7.2 | 12 | 9.4 | 10 |
| Production Example 3 | 3.0 | 75 | 4.3 | 13 | 4.5 | 12 |
| Production Example 4 | 3.4 | 89 | — | — | 4.2 | 11 |

Examples 1–2 and Comparative Examples 1–3

Sodium methylenebis (2,4-di-t-butylphenyl)phosphate (0.1% by weight) serving as a nucleating agent was added to each propylene resin manufactured according to the conditions of Production Examples 1–5 which were scaled up accordingly. Physical properties of each polypropylene are shown in Table 2. Through use of the thus-manufactured propylene resin composition, automobile bumper beams, each having dimensions of 1,400×100×100 mm and a weight of 5 kg, were molded under the following molding and temperature conditions.

Molding conditions
  Molding apparatus: 90 mmφ
  Screw: 90 mmφ
  Die: 100 mmφ
  Accumulator capacity: 15 liters
  Mold clamping force: 60 tons
  Rotational screw speed: 40 rpm
  Motor load: 115 A
Temperature conditions
  Cylinders No. 1: 230° C.
    No. 2: 210° C.
    No. 3: 190° C.
    No. 4: 190° C.
  Crossheads No. 1: 190° C.
    No. 2: 190° C.
    No. 3: 190° C.
  Dies No. 1: 190° C.
    No. 2: 190° C.
  Molding cycle: 200 sec
  Mold temperature: 28° C.
  Resin temperature: 220° C.

The thus-obtained automobile bumper beams were evaluated for moldability, appearance, and thickness distribution, to thereby perform overall evaluation. The results are shown in Tables 3 and 4.

(1) Moldability

A parison having a predetermined length and weight (for manufacture of a bumper beam having a length of 1,900 mm and a weight of 10 kg) was injected into a mold from an accumulator. Any variation in parison length over 5 seconds required for closing the mold was measured. Moldability was evaluated in accordance with the following criteria.

$L/L_0 < 1.10$ A: Very good $1.10 \leq L/L_0 \leq 1.15$ B: Good $L/L_0 > 1.15$ F: Failure $L_0$: Parison length as measured at completion of injection L: Parison length as measured 5 seconds after completion of injection

(2) Appearance

The appearance of the blow-molded article was evaluated by visual observation and in accordance with the following criteria.

A: Very few wrinkles or distortions are observed on a surface of the blow-molded article.

B: A large number of wrinkles or distortions are observed on a surface of the blow-molded article.

(3) Thickness Distribution

Each of the blow-molded articles was cut up, and the wall thickness of the cut edge was measured in accordance with the following criteria.

When the variation in wall thickness is:

10% or less A: Very good

Greater than 10% and not greater than 20% B: Moderate

Greater than 20% C: Poor.

(4) Pinch-off Strength

Formed on a blow-molded article is a welded portion, which is called a pinch-off portion, where the edge of a article is welded so as to seal the parison upon mold clamping. Breakage tends to start at the pinch-off portion. Therefore, improvement of weldability is needed especially in structural parts and strength-requiring parts. Welding strength of the pinch-off portion was evaluated as follows:

A bottle having a predetermined shape was blow-formed from each propylene resin composition. A belt-shaped test piece having a width of 20 mm was cut up from the bottom portion of the bottle such that the test piece contained the pinch-off portion along the lateral direction of the test piece. The thus-obtained test piece was subjected to a test performed by use of a tensile strength tester (INSTRON 1125 manufactured by Instron, USA) at an elongation rate of 50 mm/min.

The yield strength and breaking energy were employed as the index of pinch-off strength. The larger these values, the better the weldability. Yield strength is represented by the maximum stress on a stress-distortion curve. Breaking energy is represented by the value obtained through integration of values of Stress×ΔStrain in the strain range from 0 to the point of breakage on the stress-strain curve, briefly the area defined between the stress-strain curve and the X axis.

(5) Impact Resistance

The bumper beam manufactured in each Example was subjected to a pendulum test in accordance with Part 581 of Federal Motor Vehicle Safety Standards (FMVSS). In this test, the bumper beam was mounted on a carriage having a weight of 1000 kg, against which an impact ridge having a weight of 1000 kg was caused to collide at a speed of 5 miles/h, to thereby obtain a relation between the load on the bumper beam and the amount of deformation. The point of collision was set on the central portion of the bumper beam.

The test was performed at high temperature (50° C.), ambient temperature (23° C.), and low temperatures (−10° C. and −30° C.). The evaluation was conducted on the maximum value of deformation, and presence or absence of cracks.

The overall evaluation shown in Table 3 was conducted through consideration of the pinch-off strength and impact resistance shown in Table 4.

As shown in Table 4, the bumper beam of Example 2 exhibited a yield strength about 1.7 times that of comparative Example 3, which indicates about a 10-fold advantage in terms of breaking energy. The excellent impact resistance exhibited by the bumper beam of Example 2 in the pendulum test is considered to be attributable to significant improvement in welding strength of the pinch-off portion.

The high-rigidity propylene resin composition of the present invention has excellent drawdown resistance, exhibits sufficient discharge rate at low temperature, and enables high-productivity production of large-sized blow-molded parts featuring light weight, excellent rigidity, dimensional stability, and heat resistance.

A blow-molded article obtained through use of the high-rigidity propylene resin of the present invention has the above-mentioned features, and is advantageously used as, particularly, a large-sized automobile part, such as a bumper, a bumper beam, a seat back, an instrument panel, or a like part.

TABLE 2

Physical Properties of Propylene Resin Compositions

|  | Resin Used | Ethylene Unit Content (wt %) | MI (g/10 min) | Tensile Elastic Modulus (MPa) | Izod Impact Strength (kJ/m$^2$) | Elongational Viscosity [$\eta_E$] (Pas) |
|---|---|---|---|---|---|---|
| Example 1 | Resin A | 2.9 | 0.27 | 1760 | 3.0 | 4.2 × 10$^5$ |
| Comparative Example 1 | Resin B | 6.2 | 0.36 | 1660 | 3.5 | 2.8 × 10$^5$ |
| Example 2 | Resin C | 6.0 | 0.30 | 1540 | 3.6 | 4.0 × 10$^5$ |
| Comparative Example 2 | Resin D | 5.3 | 0.30 | 1610 | 3.9 | 3.1 × 10$^5$ |
| Comparative Example 3 | Resin E |  | 0.70 | 1500 | 3.5 | 2.8 × 10$^5$ |

$2.0 \times 10^5 \times MI^{-0.68} > \eta_E \geq 1.5 \times 10^5 \times MI^{-0.68}$.

TABLE 3

|  | Resin Used | Moldability L/Lo | Appearance | Thickness Distribution | Pendulum Test | Overall Evaluation |
|---|---|---|---|---|---|---|
| Example 1 | Resin A | 1.15 B | A | A | — | B |
| Comparative Example 1 | Resin B | 1.20 F | A | B | — | C |
| Example 2 | Resin C | 1.17 B | A | A | No breakage | A |
| Comparative Example 2 | Resin D | 1.20 F | B | C | — | D |
| Comparative Example 3 | Resin E | 1.14 B | A | A | Exploded | D |

Overall Evaluation
A: Excellent product performance
B: Satisfactory product performance
C: Insufficient product performance
D: Bad product performance

TABLE 4

|  |  |  | Example 2 | Comparative Example 3 |
|---|---|---|---|---|
| Pinch-off Strength | Yield Strength (kgf) |  | 70 | 41 |
|  | Breakage Energy (kgf · mm) |  | 92 | 87 |
| Pendulum Test | High Temperature (50° C.) | Maximum Deformation (mm) | 53 | 70 |
|  |  | Crack | None | None |
|  | Ambient Temperature (23° C.) | Maximum Deformation (mm) | 45 | 45 |
|  |  | Crack | None | None |
|  | Low Temperature (−10° C.) | Maximum Deformation (mm) | 36 | 37 |
|  |  | Crack | None | None |
|  | (−30° C.) | Maximum Deformation (mm) | 35 | Not measurable |
|  |  | Crack | None | Considerable breakage from the pinch-off fused portion |

What is claimed is:

1. A propylene resin composition composed of a nucleating agent and a propylene resin having a melt index (MI) of not greater than 1.2 g/10 min as measured at a temperature of 230° C. and under a load of 2,160 g and satisfying a relationship between elongational viscosity ($\eta_E$) and melt index (MI) represented by 2. The propylene resin composition according to claim 1, which further comprises a polyolefin resin other than that used in claim 1.

3. The propylene resin composition according to claim 1, which further comprises an inorganic filler.

4. The propylene resin composition according to claim 2, which further comprises an inorganic filler.

5. The propylene resin composition according to claim 1, wherein the propylene resin is obtained by subjecting a propylene polymer and a propylene-ethylene copolymer to multi-step polymerization.

6. A blow-molded article formed of the propylene resin composition as recited in claim 1.

7. A blow-molded article obtained by blow-molding the propylene resin composition as recited in claim 1 at a resin temperature not higher than 220° C.

8. An automobile bumper obtained by blow-molding the propylene resin composition as recited in claim 1 at a resin temperature not higher than 220° C.

9. An automobile bumper according to claim 8, wherein the propylene resin is obtained by subjecting a propylene polymer and a propylene-ethylene copolymer to multi-step polymerization.

10. The propylene resin composition of claim 1, wherein said relationship between elongation viscosity ($\eta_E$) and melt index (MI) is represented by $$1.763 \times 10^5 \times MI^{-0.68} \geq \eta_E \geq 1.5 \times 10^5 \times MI^{-0.68}.$$

* * * * *